Dec. 11, 1923.

F. M. LEWIS 1,477,137

DIFFERENTIAL MECHANISM

Filed Nov. 16, 1922  2 Sheets-Sheet 1

Witness:
C. J. Sauser.

Inventor:
Frank M. Lewis,
By Samuel N. Pond,
Atty.

Dec. 11, 1923.
F. M. LEWIS
DIFFERENTIAL MECHANISM
Filed Nov. 16, 1922
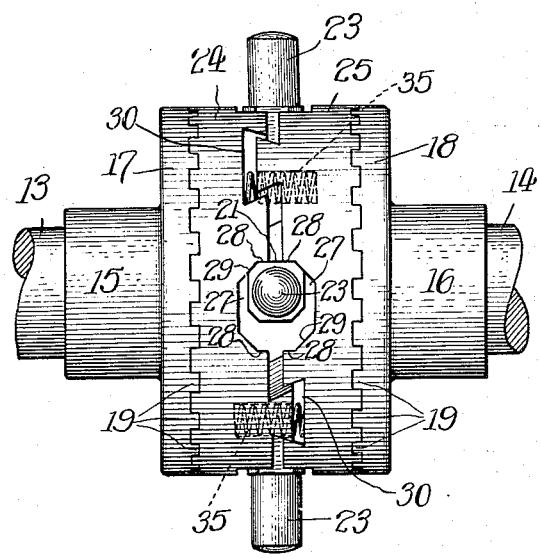
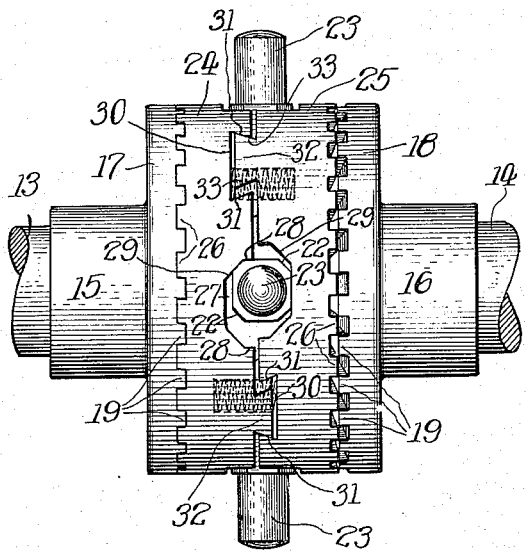
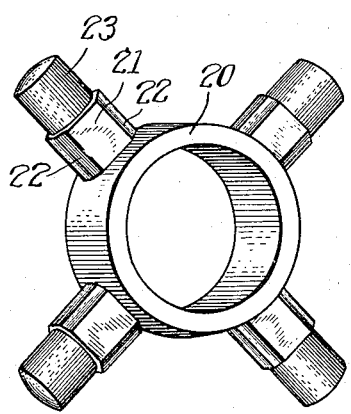
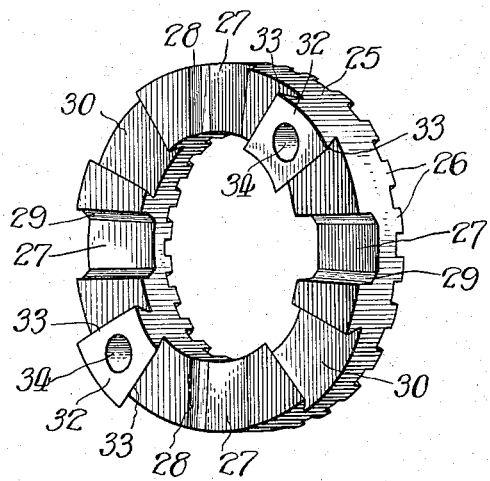
Inventor:
Frank M. Lewis Patented Dec. 11, 1923.

1,477,137

UNITED STATES PATENT OFFICE.

FRANK M. LEWIS, OF CHICAGO, ILLINOIS.

DIFFERENTIAL MECHANISM.

Application filed November 16, 1922. Serial No. 601,212.

*To all whom it may concern:*

Be it known that I, FRANK M. LEWIS, a citizen of the United States, residing at Chicago, in the county of Cook and State of Illinois, have invented certain new and useful Improvements in Differential Mechanism, of which the following is a specification.

This invention relates to differential mechanism designed mainly, but not exclusively, for use on motor vehicles, and has reference more particularly to a type of differential mechanism such as is disclosed in my former Letters Patent of the United States No. 1,292,818, dated January 28, 1919, and No. 1,430,744, dated October 3, 1922, characterized by the provision of a pair of driven clutch members fast on the inner ends of the axle sections, a pair of laterally shiftable driving clutch members between said driven clutch members, a rotatable housing enclosing said driving and driven clutch members, and a driver having the general form of a spider mounted in said rotatable housing and having radial studs in driving engagement with the inner faces of said shiftable clutch members. In both of my aforesaid patents the driving and driven clutch members are formed with co-operating teeth having inclined sides, whereby, when one driven clutch member overruns its co-operating driving clutch member it cams the latter inwardly to permit such overrunning movement. In the practical operation of such devices it has been found that, occasionally, the cam thrust of the teeth of the driven clutch member, caused by the load, acting upon the laterally shiftable driving clutch member engaged therewith, overcomes the means employed for normally maintaining said clutch members in engagement, whereby the driving clutch member is thrown out of driving engagement with the driven clutch member, and the device thus fails to function properly. This fault is overcome in the structure forming the subject matter of my later United States Patent No. 1,430,744 through a special construction of the driver and the mating recesses in the inner sides of the shiftable clutch members with which the driver co-operates; but the disengagement of the driving clutch member from the driven clutch member to permit overrunning of the latter is still effected by an outward camming action of the co-operating teeth of said clutch members.

The main object of my present invention is to improve constructions of this general type by eliminating the necessity of using transversely tapered teeth on the co-operating clutch members and making it possible to employ square teeth which afford a more powerful and efficient grip, and providing on the laterally shiftable clutch members themselves co-operating means (preferably co-operating cams) by which, when either undergoes a turning movement in either direction relatively to the other, it is positively drawn inwardly and out of engagement with its co-operating driven clutch member.

Other objects and attendant advantages of the invention will be apparent to those skilled in the art from a consideration of the following description, taken in connection with the accompanying drawings wherein I have illustrated a practical and approved embodiment of the invention, and in which—

Fig. 3 is an elevation of the same, with the rotatable housing omitted, and showing the parts in normal running position, wherein both axle sections are driven;

Fig. 4 is a view similar to Fig. 3, but showing the relative positions of the parts when the right hand axle is running at a greater speed than the left hand axle;

Fig. 5 is a perspective elevation of the driver spider; and

Fig. 6 is a perspective elevation, viewed from its inner side, of the right hand shiftable clutch member; it being understood that the mating left hand shiftable clutch member embodies the same construction.

Figure 1:
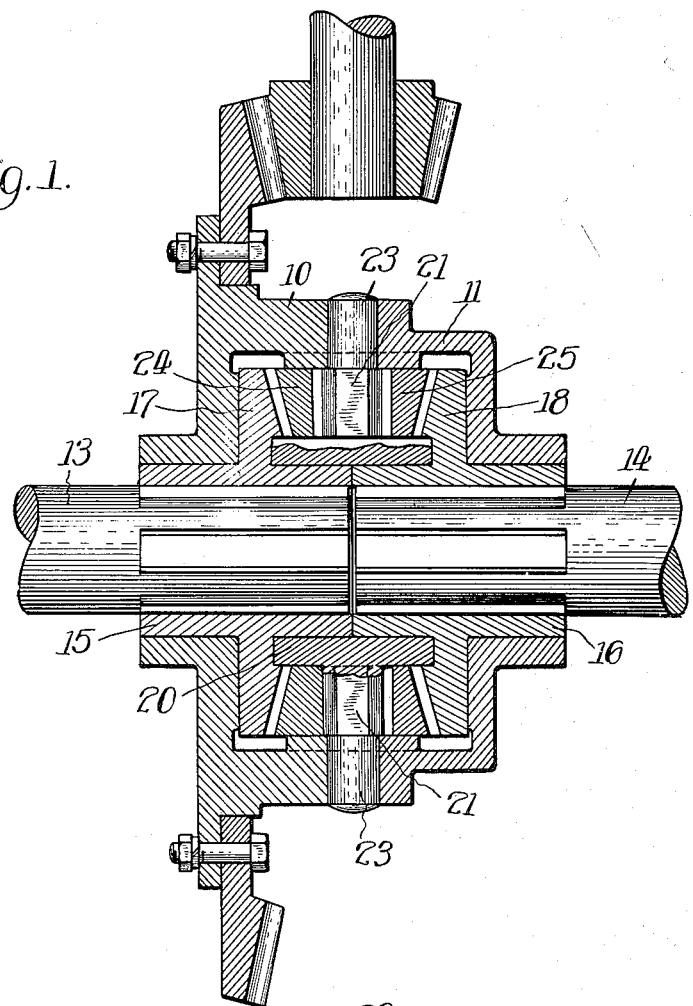
Fig. 1 is an axial section of my improved differential mechanism.

Referring to the drawings, 10 and 11 designate co-operating halves of a rotatable housing, united by bolts 12 (Fig. 2) and enclosing the principal co-operating parts of the differential gear. Into opposite ends of this housing are entered the two axle sections 13 and 14. On the latter are keyed the hubs 15 and 16 of a pair of outer driven members 17 and 18, which latter are formed on their inner sides with radial clutch teeth 19. In the construction shown the outer ends of the hubs 15 and 16 constitute bearings for the rotatable housing.

Figure 2:
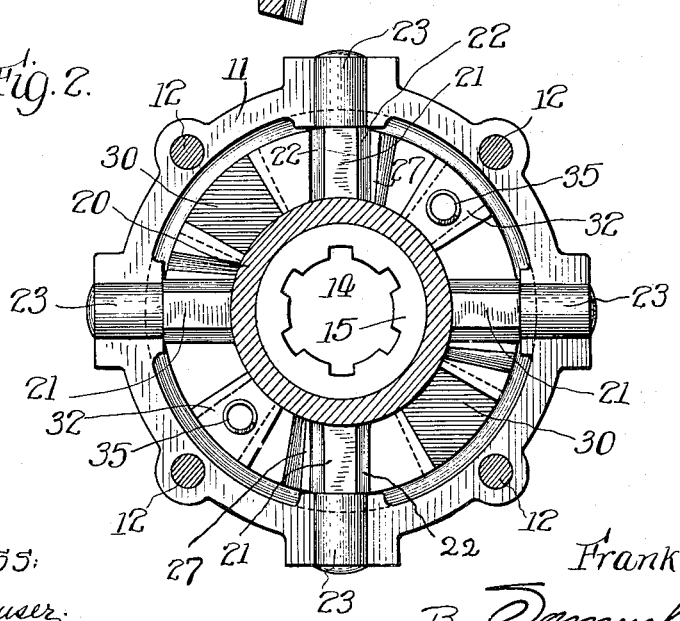
Fig. 2 is a substantially central transverse section through the same.

On the inner portions of the hubs 15 and 16 is rotatably mounted the relatively long hub 20 of a driver spider, the hub 20 serving to maintain the hubs 15 and 16 and the shaft sections 13 and 14 in accurate axial alignment. In the instance shown, the driver spider has four radial arms, each arm comprising an inner squared portion 21 preferably formed with beveled corners shown at 22 (Fig. 5) and an outer round portion 23, which latter, as clearly shown in Figs. 1 and 2, is rigidly mounted in and between the mating sections 10 and 11 of the rotatable housing.

Between this driver spider and the driven clutch members 17 and 18 are located a pair of driving clutch members 24 and 25, one of which, (25) is illustrated in perspective elevation in Fig. 6; it being understood that the companion member 24 embodies the same construction reversed as to position. Each of these members takes the form of an annulus, the outer periphery of which has a free running fit on the inner circular wall of the rotatable housing, while its inner periphery has a similar running fit on the hub 20 of the spider. On the outer side of each of these members is a ring of radial clutch teeth 26, adapted to interfit and co-operate with the clutch teeth 19 of the driven members 17 and 18. It will be observed by reference to Figs. 3, 4 and 6 that the clutch teeth of the driving and driven clutch members are substantially square or rectangular in cross-section. On the inner side of each of the shiftable clutch members 24 and 25 are formed radial recesses 27 corresponding in number to the radial arms of the spider. Each of these recesses is formed with substantially parallel end walls 28 that are normal to the plane of rotation of the spider, and, under the drive of the latter are squarely engaged with the forward flat side of the spider arm. The opposite corners of each recess are tapered or beveled as shown at 29 corresponding with the tapered corners 22 of the spider arm, but are of somewhat greater depth, for a purpose hereinafter described. As clearly shown in Figs. 3 and 4, the mating recesses 27 on the two shiftable members embrace the inner squared portions of the arms or studs of the spider, with a limited amount of both longitudinal and lateral clearance.

At diametrically opposite points on each of the shiftable clutch members 24 and 25 are formed a pair of recesses 30 of dovetail form, the oppositely inclined side walls 31 of which constitute cams that co-operate with correspondingly located projections 32 of similar form on the companion clutch member. The oppositely inclined side walls 33 of said projections constitute cams that co-operate with the cams 31 of the recesses 30. It will be observed by reference to Fig. 3 that the cam recesses 30 are slightly wider than the cam projections 32, permitting a limited relative in and out movement of said projections and recesses. These cam projections and recesses also serve to limit the relative rotation of the two driving clutch members 24 and 25 to the amount necessary to effect the disengagement of the clutch teeth of either from its co-operating clutch teeth on the driven clutch member 17 or 18. In the face of each cam projection 32 is formed a hole 34 which constitutes a seat for a coil compression spring 35, the projecting end of the spring having a bearing on the bottom wall of the cam recesses 30, and said spring serving to start and urge the driving clutch members 24 and 25 apart and into driving engagement with their co-operating driven clutch members 17 and 18, as shown in Fig. 3.

Briefly describing the operation of the mechanism, under normal forward running conditions the parts have the relative position shown in Fig. 3, wherein both of the driving clutch members 24 and 25 are in clutch engagement with the driven members 17 and 18, and are themselves driven by the thrust of the flat forward sides 21 of the spider arms against the end walls 28 of the stud recesses 27; the driving clutch members being maintained in such engagement by the thrust of the cam inclines 29 and 22 supplementing the thrust of the springs 35. When, however, one axle of the vehicle over-runs the other, as, for instance, the right hand axle 14 in Fig. 4, the driving clutch member 25 is caused to correspondingly run ahead of the driving clutch member 24, and the co-operation of the cam sides 33 and 31 causes the clutch member 25 to be drawn inwardly, thereby disengaging it from its driven clutch member 18, which latter may then continue to overrun the other clutch member 17 to any required extent. This at the same time advances the cam 29 over the cam 22. As soon as the running speeds of the two axles are again equalized, the springs 35 act to start the clutch member 25 back to its normal running position shown in Fig. 3, and this backward movement is completed by the push of the cam 22 on the cam 29. Manifestly when the left axle 13 overruns, the same action takes place, the clutch member 24 camming itself inwardly and disengaging its teeth from the teeth of the driven clutch member 17. Since the co-operating cam projections and recesses are double ended, the same action occurs when the axles are running backwardly.

From the foregoing it will be apparent that my present invention provides cooperating means on the two driving clutch members 24 and 25 by which either is disengaged from its driven clutch member whenever the axle carrying said driven clutch member overruns the other axle. This it will be seen eliminates the necessity of providing beveled clutch teeth to effect the camming out of the driving clutch member during differential movement, and enables the clutch teeth to be made substantially square, thus affording a more powerful and certain clutch engagement which will not slip or yield under excessive loads.

While I have herein shown one practical and workable embodiment of the invention, it will be manifest that the operative principle thereof may be embodied in other and different specific forms; and, believing myself to be the first to provide a differential mechanism of the type described wherein co-operating means are provided on the laterally shiftable driving clutch members for disengaging either of said members from its driven clutch member under a relative turning movement of said shiftable members, I reserve all such variations and modifications as fall within the spirit and purview of the appended claims.

I claim—

1. In a differential mechanism, the combination of a rotatable housing, axle sections entered within the opposite ends of said housing, driven clutch members fast on said axle sections, shiftable clutch members between said driven members formed with recesses in their adjacent sides, a driver connected to said housing and having portions thereof disposed within mating recesses of said shiftable members, means urging said shiftable members outwardly into clutch engagement with said driven members, and co-operating means on said shiftable members effecting a relative inward movement thereof under a relative turning movement of said shiftable members.

2. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having radial studs disposed within mating recesses of said shiftable members, means urging said shiftable members outwardly into clutch engagement with said driven members, and cam means on said shiftable members co-operating to effect a relative inward movement thereof under a relative turning movement of said shiftable members.

3. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having portions thereof lying within mating recesses of said shiftable members, means urging said shiftable members outwardly into clutch engagement with said driven members, and cam means on the inner opposed faces of said shiftable members co-operating to effect a relative inward movement thereof under a turning movement of either of said shiftable members in either direction relatively to the other.

4. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having portions thereof lying within mating recesses of said shiftable members, means urging said shiftable members outwardly into clutch engagement with said driven members, and inter-engaging cam projections and recesses on the inner opposed faces of said shiftable members co-operating to both limit the relative rotation of said shiftable members and effect a relative inward movement thereof under a turning movement of either of said shiftable members in either direction relatively to the other.

5. In a differential mechanism, the combination of a rotatable housing, axle sections entered within the opposite ends of said housing, driven clutch members fast on said axle sections, laterally shiftable driving clutch members between said driven members formed with recesses in their adjacent sides, said driven and driving clutch members having co-operating teeth of substantially rectangular cross-section, a driver connected to said housing and having portions thereof disposed within mating recesses of said driving clutch members, means urging said driving clutch members outwardly into engagement with said driven clutch members, and co-operating means on said driving clutch members effecting a relative inward movement thereof under a relative turning movement of said driving clutch members.

6. In a differential mechanism, the combination of a rotatable housing, axle sections entered within the opposite ends of said housing, driven clutch members fast on said axle sections, laterally shiftable driving clutch members between said driven members formed with recesses in their adjacent sides, said driven and driving clutch members having co-operating teeth of substantially rectangular cross-section, a driver connected to said housing and having radial studs disposed within mating recesses of said driving clutch members, means urging said driving clutch members outwardly into engagement with said driven clutch members, and cam means on the inner opposed faces of said driving clutch members co-operating to effect a relative inward movement thereof under a turning movement of either of said driving clutch members in either direction relatively to the other.

7. In a differential mechanism, the combination of a rotatable housing, axle sections entered within the opposite ends of said housing, driven clutch members fast on said axle sections, laterally shiftable driving clutch members between said driven clutch members formed with recesses in their adjacent sides, said driven and driving clutch members having co-operating teeth of substantially rectangular cross-section, a driver spider connected to said housing and having radial arms formed with squared portions lying within mating recesses of said shiftable members, springs urging said driving clutch members outwardly into engagement with said driven clutch members, and inter-engaging cam projections and recesses on the inner opposed faces of said driving clutch members co-operating to both limit the relative rotation of said driving clutch members and effect a relative inward movement thereof under a turning movement of either of said driving clutch members in either direction relatively to the other.

8. In a differential mechanism, the combination of a rotatable housing, axle sections entered within the opposite ends of said housing, driven clutch members fast on said axle sections, laterally shiftable driving clutch members between said driven clutch members formed with recesses in their adjacent sides, a driver connected to said housing and having portions thereof disposed within mating recesses of said driving clutch members, inter-engaging cam projections and recesses on the inner opposed faces of said driving clutch members co-operating to effect a relative inward movement thereof under a turning movement of either of said driving clutch members relatively to the other, said cam projections formed with spring pockets in their faces, and compression springs seated in said pockets and abutting against the bottoms of said cam recesses.

9. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having portions thereof disposed within mating recesses of said shiftable members, co-operating means on said driver and said shiftable members for forcing the latter outwardly into, and maintaining them in, clutch engagement with said driven members, and co-operating means on said shiftable members effecting a relative inward movement thereof under a relative turning movement of said shiftable members.

10. In a differential mechanism, the combination of a rotatable housing, axle sections entered within the opposite ends of said housing, driven clutch members fast on said axle sections, laterally shiftable clutch members between said driven members formed with recesses in their adjacent sides, a driver connected to said housing and having radial studs disposed within mating recesses of said shiftable members, co-operating cams on said driver and said shiftable members for forcing the latter outwardly into, and maintaining them in, clutch engagement with said driven members, and co-operating cams on said shiftable members effecting a relative inward movement thereof under a relative turning movement of said shiftable members.

FRANK M. LEWIS.